(12) United States Patent
Wells et al.

(10) Patent No.: US 7,951,006 B2
(45) Date of Patent: May 31, 2011

(54) METHOD FOR DOWNLOADING DATA TO GAMING DEVICES

(75) Inventors: Bill Wells, Reno, NV (US); Richard Wilder, Sparks, NV (US)

(73) Assignee: IGT, Reno, NV (US)

(*) Notice: Subject to any disclaimer, the term of this patent is extended or adjusted under 35 U.S.C. 154(b) by 1260 days.

(21) Appl. No.: 11/248,645

(22) Filed: Oct. 12, 2005

(65) Prior Publication Data

US 2006/0040745 A1 Feb. 23, 2006

Related U.S. Application Data

(63) Continuation of application No. 10/352,404, filed on Jan. 28, 2003, now Pat. No. 7,785,204, which is a continuation of application No. 09/172,786, filed on Oct. 14, 1998, now Pat. No. 6,805,634.

(51) Int. Cl.
*A63F 9/00* (2006.01)

(52) U.S. Cl. ............... 463/42; 463/29; 463/40; 463/41; 463/43

(58) Field of Classification Search .................. 463/29, 463/40–43

See application file for complete search history.

(56) References Cited

U.S. PATENT DOCUMENTS

| | | |
|---|---|---|
| 3,703,727 A | 11/1972 | Knowlton |
| 3,845,472 A | 10/1974 | Buchanan et al. |
| 4,305,148 A | 12/1981 | Deglin |
| 4,648,063 A | 3/1987 | Strout |
| 5,086,410 A | 2/1992 | Bergemont |
| 5,142,624 A | 8/1992 | Patrick, II |
| 5,155,847 A | 10/1992 | Kirouac et al. |
| 5,166,886 A | 11/1992 | Molnar et al. |
| 5,398,932 A | 3/1995 | Eberhardt et al. |
| 5,440,632 A | 8/1995 | Bacon et al. |
| 5,445,295 A | 8/1995 | Brown |
| 5,467,609 A | 11/1995 | Feeney |
| 5,497,479 A | 3/1996 | Hornbuckle |
| 5,539,304 A | 7/1996 | Payne et al. |
| 5,577,735 A | 11/1996 | Reed et al. |
| 5,593,349 A | 1/1997 | Miguel et al. |
| 5,643,086 A | 7/1997 | Alcorn et al. |
| 5,644,704 A | 7/1997 | Pease et al. |
| 5,663,591 A | 9/1997 | Iranmanesh |
| 5,668,591 A | 9/1997 | Shintani |

(Continued)

FOREIGN PATENT DOCUMENTS

EP 0 735 764 7/2000

(Continued)

OTHER PUBLICATIONS

Bao et al. New Attaks to Public Key Cryptosystems on Tamperproof Devices [onlin], [retrieved on Sep. 11, 2009]. Retrieved from the INternet <URL: http://www.ieee-security.org/Cipher/Newsbriefs/1996/961029_sgtamper.html>.*

(Continued)

*Primary Examiner* — Dmitry Suhol
*Assistant Examiner* — David Duffy
(74) *Attorney, Agent, or Firm* — Weaver, Austin, Villeneuve & Sampson LLP (57) ABSTRACT

Memories coupled to a gaming terminal, are reprogrammed by a method and apparatus which includes identification, negotiation, downloading and verification information from an external information source to a gaming terminal. Hardware devices are used to identify gaming terminals or components.

27 Claims, 6 Drawing Sheets

U.S. PATENT DOCUMENTS

| | | | |
|---|---|---|---|
| 5,752,042 A | 5/1998 | Cole et al. | |
| 5,759,102 A | 6/1998 | Pease et al. | |
| 5,790,753 A | 8/1998 | Krishnamoorthy et al. | |
| 5,805,814 A | 9/1998 | Tsuda et al. | |
| 5,809,251 A | 9/1998 | May et al. | |
| 5,825,880 A | 10/1998 | Sudia et al. | |
| 5,845,090 A | 12/1998 | Collins et al. | |
| 5,851,149 A | 12/1998 | Xidos et al. | |
| 5,867,714 A * | 2/1999 | Todd et al. | 717/172 |
| 5,923,885 A | 7/1999 | Johnson et al. | |
| 5,933,647 A | 8/1999 | Aronberg et al. | |
| 5,935,246 A | 8/1999 | Benson | |
| 5,951,639 A | 9/1999 | MacInnis | |
| 5,980,384 A | 11/1999 | Barrie | |
| 5,987,376 A | 11/1999 | Olsen et al. | |
| 5,999,741 A | 12/1999 | May et al. | |
| 6,023,586 A | 2/2000 | Gaisford et al. | |
| 6,044,471 A | 3/2000 | Colvin | |
| 6,049,671 A | 4/2000 | Slivka et al. | |
| 6,071,190 A | 6/2000 | Weiss et al. | |
| 6,073,214 A | 6/2000 | Fawcett | |
| 6,074,434 A | 6/2000 | Cole et al. | |
| 6,104,815 A | 8/2000 | Alcorn et al. | |
| 6,135,887 A | 10/2000 | Pease et al. | |
| 6,151,708 A | 11/2000 | Pedrizetti et al. | |
| 6,199,204 B1 | 3/2001 | Donohue | |
| 6,205,579 B1 | 3/2001 | Southgate | |
| 6,209,089 B1 | 3/2001 | Selitrennikoff et al. | |
| 6,219,836 B1 | 4/2001 | Wells et al. | |
| 6,230,319 B1 | 5/2001 | Britt et al. | |
| 6,266,809 B1 | 7/2001 | Craig et al. | |
| 6,279,030 B1 | 8/2001 | Britton et al. | |
| 6,319,125 B1 | 11/2001 | Acres | |
| 6,332,217 B1 | 12/2001 | Hastings | |
| 6,341,373 B1 | 1/2002 | Shaw | |
| 6,381,741 B1 | 4/2002 | Shaw | |
| 6,487,723 B1 | 11/2002 | MacInnis | |
| 6,488,585 B1 | 12/2002 | Wells et al. | |
| 6,493,768 B1 | 12/2002 | Boutcher | |
| 6,523,166 B1 | 2/2003 | Mishra et al. | |
| 6,684,328 B2 | 1/2004 | Matsuura | |
| 6,721,889 B1 * | 4/2004 | Jaegtnes et al. | 726/34 |
| 6,805,634 B1 | 10/2004 | Wells et al. | |
| 7,785,204 B2 | 8/2010 | Wells et al. | |
| 2003/0228912 A1 | 12/2003 | Wells et al. | |

FOREIGN PATENT DOCUMENTS

| | | |
|---|---|---|
| GB | 2 151 054 | 7/1985 |
| WO | 01/20424 | 3/2001 |

OTHER PUBLICATIONS

Office Action dated May 4, 2006 U.S. Appl. No. 10/352,404.

Notice of Allowance mailed Oct. 1, 2002 from U.S. Appl. No. 09/172,786, 5 pgs.

US Examiner Interview Summary dated May 6, 2002 from U.S. Appl. No. 09/172,786.

US Office Action dated Mar. 27, 2002 from U.S. Appl. No. 09/172,786, 12 pgs.

Final Rejection dated Sep. 28, 2001 from U.S. Appl. No. 09/172,786, 13 pgs.

Advisory Action dated Aug. 22, 2001 from U.S. Appl. No. 09/172,786, 3 pgs.

Final Rejection dated Jun. 20, 2001 from U.S. Appl. No. 09/172,786, 10 pgs.

US Office Action dated Jul. 19, 2000 from U.S. Appl. No. 09/172,786, 10 pgs.

US Office Action dated Sep. 21, 2004 from U.S. Appl. No. 10/352,404, 7 pgs.

Notice of Allowance mailed Jul. 18, 2005 from U.S. Appl. No. 10/352,404.

US Office Action dated Apr. 27, 2007 from U.S. Appl. No. 10/352,404, 11 pgs.

US Office Action dated Jan. 15, 2008 from U.S. Appl. No. 10/352,404, 18 pgs.

US Office Action dated Dec. 19, 2008 from U.S. Appl. No. 10/352,404, 19 pgs.

US Office Action dated Aug. 14, 2009 from U.S. Appl. No. 10/352,404, 19 pgs.

US Notice of Allowance and Allowability and Examiner's Amendment dated Jan. 20, 2010 issued in U.S. Appl. No. 10/352,404, 6 pgs.

US Notice of Allowance and Allowability dated Apr. 28, 2010, issued in U.S. Appl. No. 10/352,404, 6 pgs.

Digital Signature Standard (DSS), Federal Information Processing Standards Publication 186 [online], May 19, 1994 [retrieved Dec. 17, 2007]. Retrieved from the Internet: <URL:http://www.itl.nist.gov/fipspubs/fip186.htm>.

18 USC 95 §1955. Government Printing Office prior to Jan. 4, 1995 [online], [retrieved on Dec. 17, 2008]. Retrieved from the Internet <URL: http://frwebgate5access.gpo.gov/cgi-bin/TEXTgate.cgi?WAISdocID=557589301834+0+1+0&WAISaction=retrieve>.

European Search Report dated Jan. 16, 2001 and Communication, issued in 99119351.7.

* cited by examiner

FIG. 5

METHOD FOR DOWNLOADING DATA TO GAMING DEVICES

PRIORITY CLAIM

This application is a continuation of, claims priority to and the benefit of U.S. patent application Ser. No. 10/352,404 filed Jan. 28, 2003 now U.S. Pat. No. 7,785,204, which is a continuation of, claims priority to and the benefit of U.S. patent application Ser. No. 09/172,786 filed on Oct. 14, 1998, now U.S. Pat. No. 6,805,634, the entire contents of which are incorporated herein.

CROSS-REFERENCE TO RELATED APPLICATIONS

Cross-reference is made to U.S. Ser. No. 09/088,205 filed Jun. 1, 1998, which is a continuation of Ser. No. 08/600,311 (for "PERIPHERAL DEVICE DOWNLOAD METHOD AND APPARATUS" filed Feb. 12, 1996), both incorporated herein by reference.

The present invention relates to a method and apparatus for downloading information to a gaming device and in particular, to a process for using a computer, directly or remotely, to transfer information to a gaming device in a secure fashion.

BACKGROUND INFORMATION

Many current gaming machines are configured with electronic components, commonly mounted on one or more printed circuit boards (PCBs). Many such electronic components use programming or other information stored in memories. In at least one typical configuration, a gaming terminal or gaming machine will include a controller board, a communications board or module, and one or more so-called peripheral boards such as a display controller board, a currency acceptor board, a coin handler board, and the like. Typically at least one board, such as the game controller board, includes a processor (e.g., a microprocessor) or other computer unit which often operates based on programming or other information (software) stored in a memory such as one or more electronically erasable programmable read-only memories (EEPROMS). Such software may be programmed or stored in the memory locations during the manufacturing or assembly of the gaming device. Additionally, software may be provided to replace or supplement the software in a gaming device which is in operation (in the field), e.g. to add new features, implement new games and the like, and/or to correct programming errors. In either case, the new software is transferred or "downloaded" from a source (which may be, e.g., a computer such as a workstation personal computer, laptop computer, and the like) to the "target" memory in a particular gaming terminal or machine.

Downloading from one computer to another is a process that is known, in general. In one previous system, information from a host system such as a state lottery host has been downloaded to a clerk validation terminal (CVT). A clerk validation terminal is used for verifying a ticket obtained from a lottery terminal e.g. to verify a validation number, amount and the like before a lottery ticket is paid, e.g. as an anti-counterfeiting procedure. However, downloading software to components of gaming devices and/or to a plurality of gaming devices or components thereof presents particular problems not readily addressed by conventional downloading techniques.

One aspect applicable to gaming devices is the stringent regulatory oversight and control exercised by regulatory authorities in many jurisdictions. In many, and perhaps all, regulated gaming jurisdictions, downloading of software to a gaming terminal will not be permitted without some assurance that the new software will comply with local regulations.

For example, a gaining regulatory authority in one jurisdiction may require assurance that downloading to, e.g., update bill acceptor software will result in a machine having bill acceptor software appropriate (and approved) for that jurisdiction (and will not, e.g., run the risk of inadvertently and/or intentionally downloading bill acceptor software that was approved in a different jurisdiction).

It is also commonly found that gaming devices occur in a wide variety of configurations, such as employing numerous different types of processors, memories, game configurations, versions and types, peripheral hardware and software and the like. Additionally, owing to differences in manufacturing dates, maintenance history and the like, gaming devices are often encountered with a wide variety of different hardware and software components which may not be apparent (or may be discernable only with difficulty) from a visual inspection of the gaming device, its components, or its operation. For this reason, when it is desired to download software to a particular gaming terminal, it is typically necessary to select a particular software version for downloading, bearing in mind the types of software and hardware found on the particular gaming terminal, lest the newly-downloaded software is incompatible with the gaming terminal or results in operation which is not approved by a particular jurisdiction. Additionally, it is possible that the software which is to be downloaded is, in fact, already present on a particular gaming terminal, so that the download process represents a waste of time and effort.

Although many types of memories can be modified to store other or additional programs (such as an erasable programmable read-only memory or EPROM), in many previous devices this was often a labor-intensive and time-consumptive procedure, sometimes involving removing the EPROM or other memory device and reprogramming it in a separate device and/or replacing it with a differently-programmed memory device. Many pin-type memory devices are configured to tolerate only a limited number of removal and insertion operations. Other memory devices are configured for solder connection or are otherwise not readily replaceable, necessitating replacement of an entire board to effect updating.

Such manual operations have, in the past, typically required a significant investment of time, especially when a relatively large number of gaming terminals are being programmed or reprogrammed. To make matters worse, the time investment is typically made by relatively highly-trained personnel. Such investment of time by relatively highly-trained personnel represents a significant expense involved in storing or updating gaming terminal programming or other information which, owing at least partly to the regulatory environment found for gaming devices, was previously believed to be a largely unavoidable cost. Furthermore, it has been found that even relatively highly-trained personnel have an undesirably high error rate when attempting to perform a download which may lead to inoperability or improper operation of a gaming device, or violation of gaming jurisdiction laws or rules and may require an additional investment of time to correct such errors.

This situation is particularly burdensome in the context of gaming devices in which it is sometimes necessary or desirable to change the programming in a large number of peripheral devices in a relatively short amount of time. One example of such a situation is when it is desired to reprogram a bill acceptor, e.g. to thwart a previously-unknown counterfeiting scheme. Previous systems which required labor-intensive and time-intensive reprogramming methods increased the risk of incurring losses during the time it took to perform this reprogramming for all the various gaming machines (e.g., in a plurality of different casinos) or their various components. An important feature of the invention is that it allows for download of data to multiple gaming devices simultaneously.

Another feature of many gaming devices which affects the manner in which revisions of software can or should be performed is the fact that gaming devices are often configured to dispense money so there is a potential for modifications or downloads to be performed in an unauthorized fashion in such a manner as to create unauthorized or improper payouts. This is a potential which is typically not present in many other types of downloads from one computer to another. Accordingly, it is important, not only to gaming regulatory authorities but also to casinos or other game operators, to achieve a level of confidence that not only will inadvertent (e.g. cross jurisdictional) downloads be avoided but there are procedures in place to avoid or prevent intentional or unauthorized downloads.

Furthermore, previous reprogramming took place in a relatively conspicuous manner requiring personnel to access the interior of each individual peripheral and/or terminal, often for an extended period of time, thus potentially alerting the counterfeiters that they had been detected and decreasing the likelihood of using the new software to identify (possibly leading to apprehension of) the counterfeiters. In addition, the time during which a machine was being fitted with the new programs was time that the machine was out of service and not generating revenues.

In some situations, it may be advantageous to update the programming of two or more different gaming terminals and/or two or more different peripheral devices coupled to a single gaming device. Previous methods would, in this situation, typically have required separately accessing each of the gaming terminals and/or peripheral devices in order to modify or update programming.

As noted, it is often desirable to reprogram gaming terminals, e.g. to accommodate new games, regulatory changes, correct bugs or other programming errors, install new features and the like. Preferably, this should be accomplished with a minimum of down time of gaming devices (which often are intended normally to be accessible 24 hours a day) and a minimum of inconvenience to players.

Accordingly, it would be advantageous to provide a method and apparatus for downloading programming information in a manner which is less labor-intensive and less costly than previously provided, preferably without requiring individual direct access to each peripheral device which is being reprogrammed, and preferably while providing sufficient security and reliability safeguards that fully and partially automatic downloads will be permitted by gaming regulatory authorities.

SUMMARY OF THE INVENTION

The present invention provides for securely loading information, received from an external device (such as a laptop or a networked central computer) to one or more gaming devices. Preferably, the secure downloading system provides identification, negotiation, data transfer and verification features. Identification involves obtaining information for characterizing the hardware and/or software on a gaming terminal or other target. The identification information can be used to provide assurance that the programming or other data to be downloaded and/or the download procedures are appropriate for the target device. Negotiation involves providing information from the source to the target, relating to the download, such as where to load, compression information (if any) and the like. Preferably the source requests approval from the target device before data transfer begins. Preferably, data transfer is performed block-wise with checking of each block. Verification can be performed by the source requesting a digital signature calculated from the transferred data, preferably based on a public key decryption algorithm.

In one embodiment, the update or modified peripheral device program is received in the gaming terminal (or other computing device) from an external device (such as a handheld or portable device or a central computer coupled via a communications link) and is downloaded from the gaming terminal controller board to one or more coupled peripheral devices. Preferably, the programming information is downloaded in such a way as to reduce or minimize the amount of down time or inconvenience to players. In one embodiment, when the new peripheral program is downloaded from a central computer to each gaming terminal, the method avoids disabling all gaming terminals at the same time, such as by waiting until the gaming terminal is idle for a predetermined period before downloading the new program to peripheral devices or by cycling through various gaming terminals or groups of gaming terminals so that a relatively small number of the gaming terminals are disabled (for reprogramming) at any one time. Additionally, the invention allows for download to multiple gaming devices or peripheral devices simultaneously.

DETAILED DESCRIPTION OF THE PREFERRED EMBODIMENT

Figure 1A:
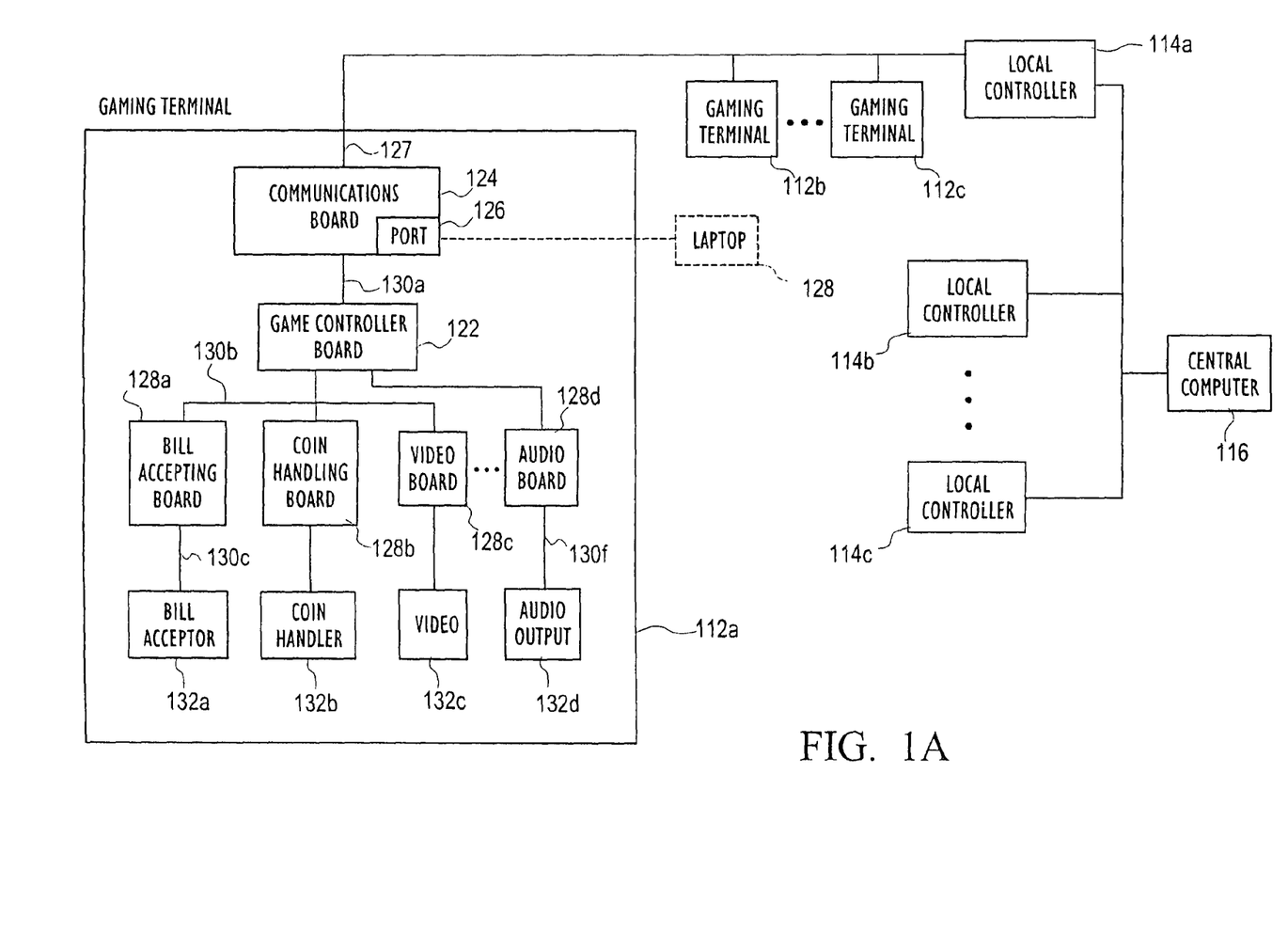
FIG. 1A is a block diagram depicting components of a multi-terminal gaming system, including components of a gaming terminal, of a type which may be used in connection with the present invention.

Although the present invention can be used in connection with many types of gaming terminals either as stand-alone devices or coupled in any number of different multi-terminal configurations, one example of a gaming terminal 112a coupled, along with other gaming terminals 112b,c, via one or more local controllers 114a,b,c to a central computer 116 is depicted in FIG. 1A. In the embodiment of FIG. 1A, gaming terminal 112a (and, typically, all gaming terminals in the group) includes a game controller board 122 which will typically include, among other items, a microprocessor and a memory such as an EEPROM storing programming and/or other information for controlling an operation of the controller board 122. Typically the hardware and software of the game controller board 122 will contain the information defining the type of game and making determinations of the win/loss local outcome (as opposed to, e.g., a progressive win/loss outcome) for the gaming terminal 112a. Because of the central role of the game controller board 122 in determining any monetary payout, it is particularly important to assure the presence of the correct software for the game controller board to avoid improper or incorrect payouts and to assure compliance with local regulatory authorities. Although it is possible to combine numerous functions onto a given board, typically numerous boards will be provided in a gaming terminal for forming a plurality of functions. In the depicted embodiment, the game controller board communicates with a communications board 124 which provides information to and, receives the information from a local controller 114a and/or central computer 116, for purposes such as monitoring use and performance, assuring compliance, performing accounting and similar functions, and facilitating implementation of progressive or other multi-terminal based games or prizes. In one embodiment, the communications board 124 includes one or more ports by which a laptop 128 or other computer may be coupled to the gaming terminal 112a for, among other purposes, downloading as described more fully below. In the embodiment of FIG. 1A, a plurality of peripheral boards 128a-d communicate with the game controller board 122 and control various peripheral devices for performing various functions such as bill acceptor functions 132a, coin handling functions 132b, video functions 132c and audio output functions 132d. In many configurations, some or all of the peripheral and other boards 128a-d, 124 will contain EEPROMs or other devices for storing software for running on microprocessors or other computing devices on such boards.

Figure 1B:
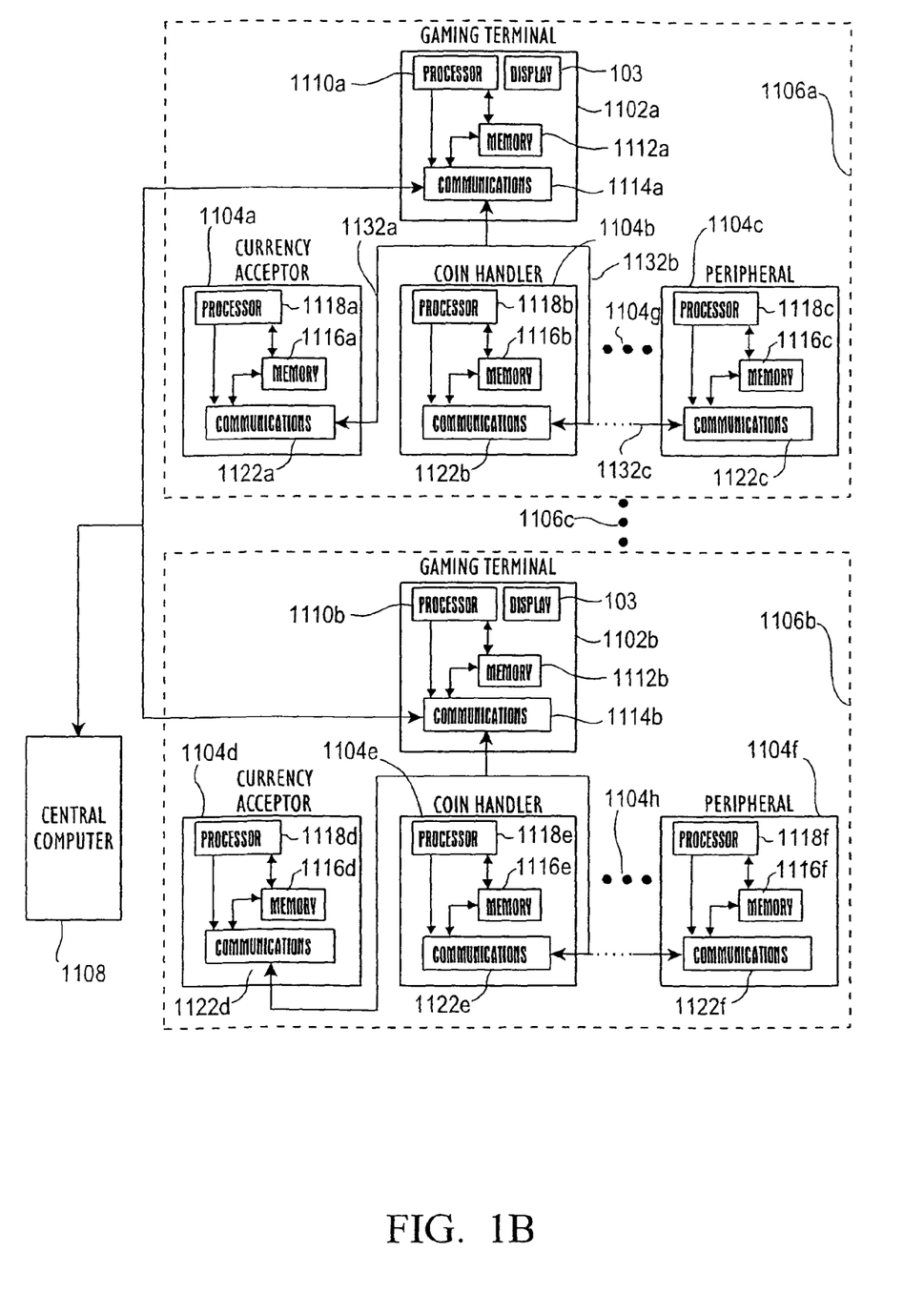
FIG. 1B is a block diagram of a plurality of gaming terminals, each coupled to a plurality of peripheral devices, and a central computer coupled to the gaming terminals which can be used according to an embodiment of the present invention.

As depicted in FIG. 1B, a computing device such as one or more gaming terminals 1102a, 1102b may be coupled to various peripheral devices 1104a,b,c,d,e,f. Many types of peripheral deices can be provided, including the currency acceptor as depicted including, for example, printers, display screens or devices, keypads and the like. More than three peripheral devices may be provided, or fewer may be provided. The gaming terminal or other computing device may be housed in the same housing 1106a, 1106b as the peripheral devices 1104a-f, and more than two gaming devices may be used in connection with the download procedure. In one embodiment, download of information to the gaming terminals 1102a, 1102b is provided from a central computer 1108. However, it is possible to use the present invention in connection with stand-alone gaming terminals and peripherals which are not connected to a central computer 1108.

In the depicted embodiment, each gaming terminal includes a processor 1110a, 1110b, a memory 1112a, 1112b, and a communications module 1114a, 1114b. In the depicted embodiment, the processor 1110 is coupled to both the memory 1112 and the communications module 1114 and the memory and communications modules 1114, 1112 are coupled together to permit communication therebetween. In one embodiment, the processor 1110a is an Intel processor model 80960, although the invention can be used in connection with computing devices having other types of processors and in connection with gaming terminals which are controlled by devices other than microprocessors such as ASICS.

Following the establishment of the communication link 206, (FIG. 2) information is transferred from the information source to one or more gaming terminals. In one embodiment, if desired, the information is encrypted before being transmitted to the gaming terminal, particularly if the information is transmitted over a local area or wide area network to avoid the possibility of unscrupulous individuals gaining access to the information. Many types of data transfer can be used including serial and parallel transfer. In one embodiment, the information which is downloaded may include information within more than or different from information to be used for reprogramming the memory of one of the coupled peripherals. For example, the downloaded information may contain new programming information for two or more different peripherals coupled to a gaming terminal and/or may include information for programming the gaming terminal itself, in addition to, or rather than, one or more of the peripherals.

In the strict regulatory environment for many gaming devices, it is typically necessary to provide assurance that approved and proper software is provided in the peripheral and other boards, in addition to that provided on the game controller board.

Figure 3:
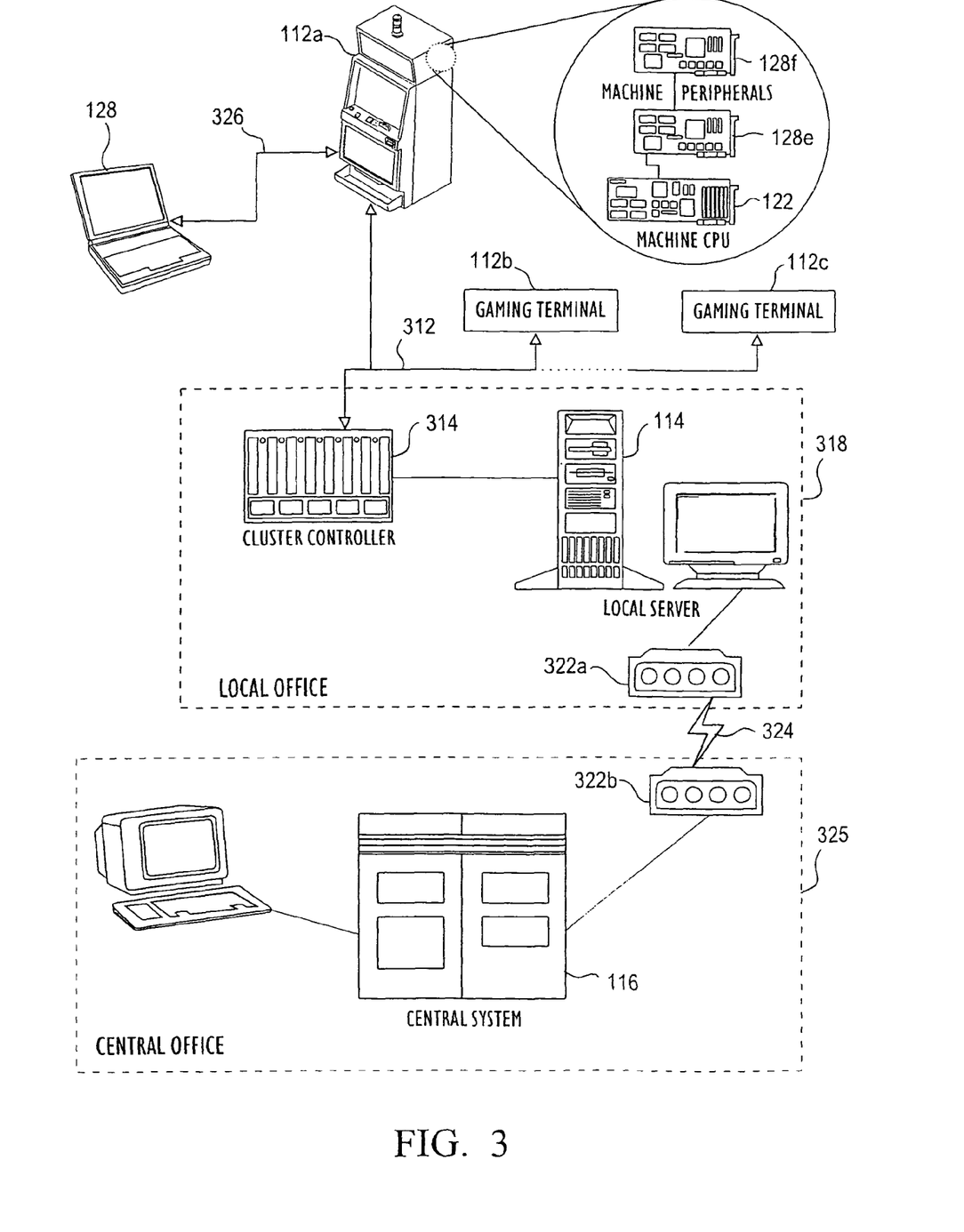
FIG. 3 is a block diagram of gaming terminals linked to a central system, usable according to an embodiment of the present invention.

FIG. 3 depicts an embodiment in which a network interface system 312 is used to connect a gaming terminal 112a, which may in turn be connected, such as in a daisy-chain fashion, to other gaming terminals 112b, 112c in a group, via a cluster controller 314 to a local server or controller 114. In the depicted embodiment, the gaming terminal 112a includes a central or controller (CPU) board 122 and one or more peripheral controller boards 128e, 128f. Although the present invention can be used in connection with a wide variety of systems and applications, in the depicted embodiment, while the gaming terminals 112a-c would typically be located in a gaming area such as a gaming region of a casino, the local servers 114 and associated devices would typically be located in a casino local office 318. The local server 114 (and, in some embodiments, additional local servers for the same or other casinos) may be coupled, e.g. via modems 322a, 322b over a LAN line or wireless link 324 to a central computer 116 typically located in a central office 325 different from the local office 318 of the casino. As depicted, preferably each gaming terminal 112 also includes a port or other connector for coupling a computer such as a laptop computer 128 e.g. via a fiber-optic, cable or other connector 326. Thus, as illustrated in FIGS. 1A, 113 and 3, transferring programming data or other information according to the present invention may be used in connection with transferring information from a remote location such as a central computer 116 or, in some cases, local server 114 to a gaming terminal 112. This procedure provides the desirable ability to download programs or other information to one, some, all or various combinations of the gaming machines 112a-c connected to the network, preferably substantially simultaneously, if desired. Such an ability is particularly useful when the target devices 112 may be relatively numerous, such as in the case of a casino or multi-casino network and/or when target devices are spread across a relatively wide region such as a plurality of lottery terminals. The download rates in such a system would typically be governed by the communication rates of the network or telecommunication system 324, 312. Also as depicted in FIGS. 1A and 3, it is possible, in addition to or in place of downloading from a central computer or local controller, to download from a computer, such as a laptop 128, coupled directly to a gaming terminal. In one embodiment, the laptop computer 128 is coupled by a fiber-optic connection 326 directly to the game controller board 122. If the programming data or other information is intended for storing on a peripheral controller (end use device a-f) the data, in this embodiment, is channeled through the game controller board (in a pass-through mode) to the peripheral controller board, if desired. This procedure can be used, e.g., on a casino floor (for repairing or updating gaming terminal software) at a lottery location, or in the manufacturing process, such as in a final assembly stage. Preferably, such a download method does not require peripheral controllers 128a-f or other boards or components to be removed from the machine and can be used on machines that have no suitable network interface 312.

Figure 4:
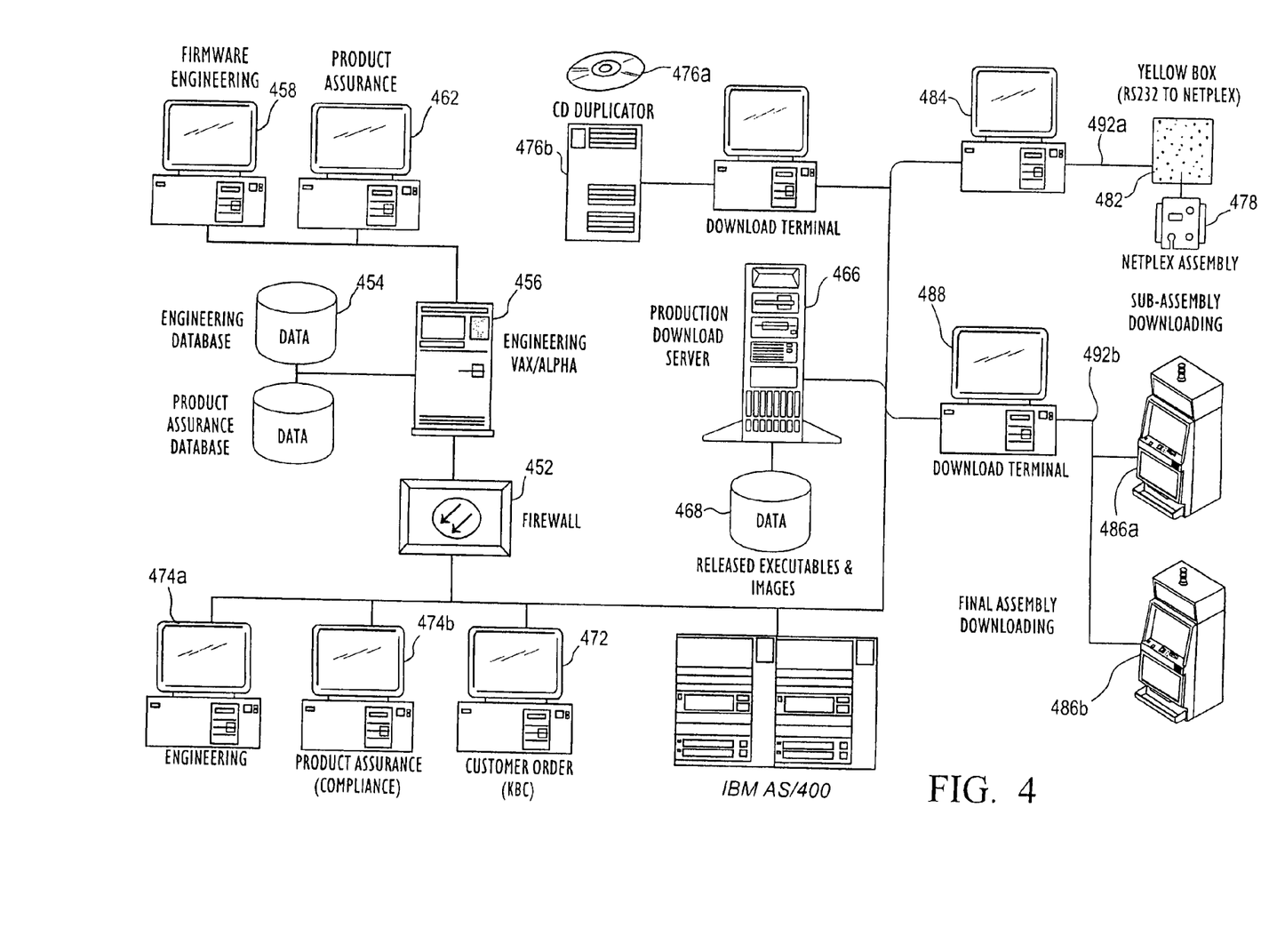
FIG. 4 is a block diagram of a gaming terminal assembly and development system usable in accordance with an embodiment of the present invention.

In addition to downloading programming or other information to gaming terminals or similar devices at a casino location, the present invention can also be used in connection with downloading information during a gaming terminal or similar device manufacturing process. FIG. 4 depicts a system usable in subassembly or final assembly downloading, e.g., in a gaming terminal manufacturing environment. FIG. 4 includes a plurality of computers such as workstation computers, network server computers, and/or PC-type computers coupled by network lines and a firewall 452 in a manner well-known to those of skill in computer network technologies.

At various stages in employing the system of FIG. 4, programming data or other information is stored in a number of different storage systems such as data bases (typically providing storage on hard drives or other well-known storage media). In the depicted embodiment, information, during program design process, is held in an engineering database 454. And software and firmware engineers use and modify such information via computers 456, 458 having at least indirect access to engineering database 454. Preferably, programs or other data which are still in the development phase are restricted to the engineering database 454 and are not stored in other databases. At some point, engineering will release the program or other information to product assurance 462 which, after review, will submit the programming or data to a gaming jurisdiction for approval. After the program or data is approved by the gaming jurisdiction, the program is copied to a production download server 466 and, preferably, stored in a released database 468. Information about the approved program is provided to a customer order system 472 and other systems such as engineering 474a and product assurance 474b. Although released programs may be provided in various forms such as on CD ROM 476a via a CD duplicator 476b, FIG. 4 also illustrates a system for downloading programming data or other information as part of a gaming terminal assembly or fabrication system. The programming or data may be loaded onto boards or other subassemblies 478, e.g. via a translator/power assembly 482 and download terminal 484 or may be loaded into one or more gaming terminals 486a,b, e.g. via connection to a communication board for downloading, in turn, to target peripheral devices or other subassemblies within the gaming terminals 486a, 486b, e.g. via a download terminal 488.

Downloading on the fabrication or assembly line, as depicted in FIG. 4 in the strict regulatory environment for many gaming devices, it is typically necessary to provide assurance that only approved and proper software and data is used in the gaming terminals, including peripheral and other boards (in addition to that provided on, e.g., the game controller board). Depending on the nature of the download, it will be advantageous, in performing assembly line downloading, to recognize or distinguish different boards, e.g. to obtain information regarding characteristics of the Board and/or its identity or history.

In the environment of the system of FIG. 4, a host device such as the download terminal 484 connects directly to the subassembly or through a test box 482 that provides the physical connection and power. A download terminal 488 can also be used to download information to boards which have already been assembled into gaming terminals 486a,b (which, provide physical connection and power and thus can be used for downloading without a test box 482). The host device 484, 488 can be network-connected as depicted or can be a standalone device. In a standalone configuration, the program information can be stored on a CD ROM 476a or other storage medium. The depicted download system can be used on the production floor as depicted or, at a service bench, e.g. for repair purposes. Preferably the download media 492a, 492b are configured to facilitate downloading of information (as opposed to, e.g., the components 312, 324 of a casino or multi-casino system which may be configured for other purposes such as data gathering, progressive game systems and the like) and can thus be configured or optimized to achieve relatively high rates of data transfer.

Figure 5:
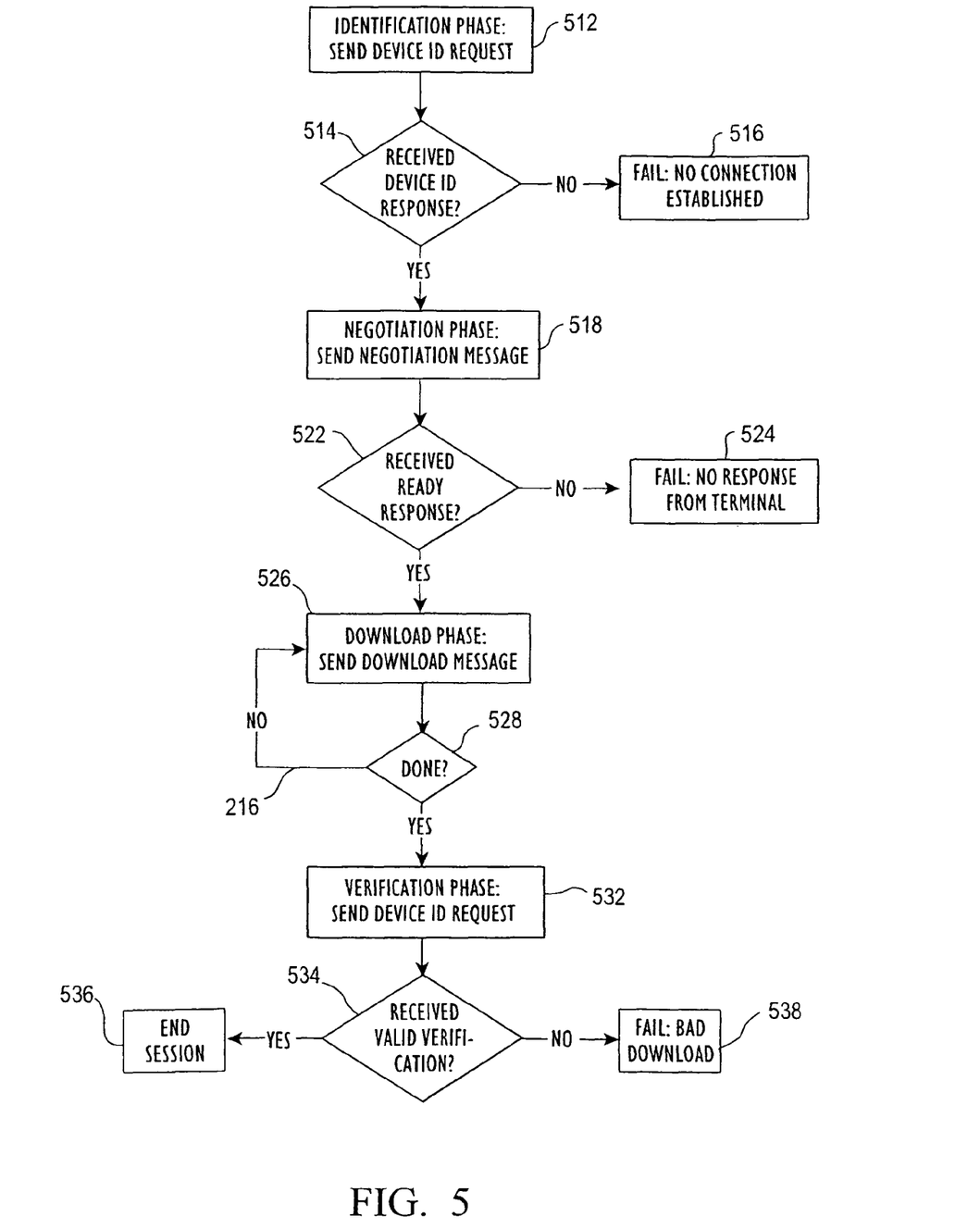
FIG. 5 is a flow chart depicting a download procedure in accordance with an embodiment of the present invention.

In order to facilitate security in downloading information, preferably so as to achieve approval for such downloading by gaming regulatory bodies, a downloading process as depicted in FIG. 5 may be used. According to the process of FIG. 5, an initial or early stage of the process involves identification. Although it may be possible to configure gaming terminals to provide identification using only software procedures (such as by providing encrypted identification data, hand shaking procedures and the like), according to one embodiment, it is preferred to provide a gaming terminal with one or more hardware-based identification components such as one or more one-time programmable and/or add-only memory devices for storing information which identifies or characterizes the gaming terminal or components thereof. In one embodiment, a gaming identification apparatus and system can be used in accordance with that described in U.S. patent application Ser. No. 09/172,787, U.S. Pat. No. 6,488,585 for "GAMING DEVICE IDENTIFICATION METHOD AND APPARATUS" filed on even date herewith and incorporated herein by reference. Providing one or more gaming terminals with such identification capability means that such gaming terminals have been placed in a "download ready" configuration according to an embodiment of the invention.

As depicted in FIG. 5, in the identification phase, the source device sends a message to the target device requesting identification information 512. When downloading is intended to download information to two or more devices, the identification (and/or the download) can be performed serially, by polling each device, or a single request addressing all target devices may be sent. If the identification response is not received 514, the system enters a failure mode and no connection is established 516. The identification response which is acceptable can include many types of information, examples of which include serial or other hardware identification numbers, manufacturing ID information or codes, manufacturer name, hardware or software revision designations, date of manufacture, installation, sale, shipping and the like, date of software revision, software file size, memory addresses and the like. Preferably, a starting address for the program to be downloaded is returned. Preferably, data integrity information such as a CRC (cyclic redundancy check) signature is returned. The identification information returned in response of the request 512 is used to verify that the information to be downloaded and/or the download procedures (such as data transfer rates) are appropriate for the hardware and software present in the target devices. For example, the returned identification information can be used to verify that the gaming jurisdiction to which the gaming terminal is subject, has approved the software which is to be downloaded, that the software which is to be downloaded is compatible with software or hardware already present in the gaming terminal and the like. If, on the basis of the identification information, it is determined that the gaming terminal already possesses the download information, the download step can be skipped.

Following the identification phase, a negotiation phase includes the sending of a negotiation message 518. The negotiation message includes information which is used to enable or facilitate the download procedure. For example, it may be necessary to inform the target device of the location or locations in memory where the downloaded information is to be stored, the size of the download file, the data transfer rate, whether any special transfer procedures such as compression, decompression, encryption, decryption and the like, are required. Preferably the negotiation message includes (or is interpreted to include) a request for a response such as an approval response, from the target device or devices. For example, waiting for approval from the target device is useful to, e.g., avoid initiating a download when there is someone currently playing the game, or when the gaming terminal is in an error mode. In one embodiment, if there are current credits on a gaming terminal, the gaming terminal is assumed to be in an actively played state. As depicted in FIG. 5, if the approval or "ready" response 522 is not received, a failure state is declared and error-handling procedures are required, such as outputting a notification to an operator and/or reinitiating the download procedure. If the ready response is received, the download phase can begin.

Figure 2:
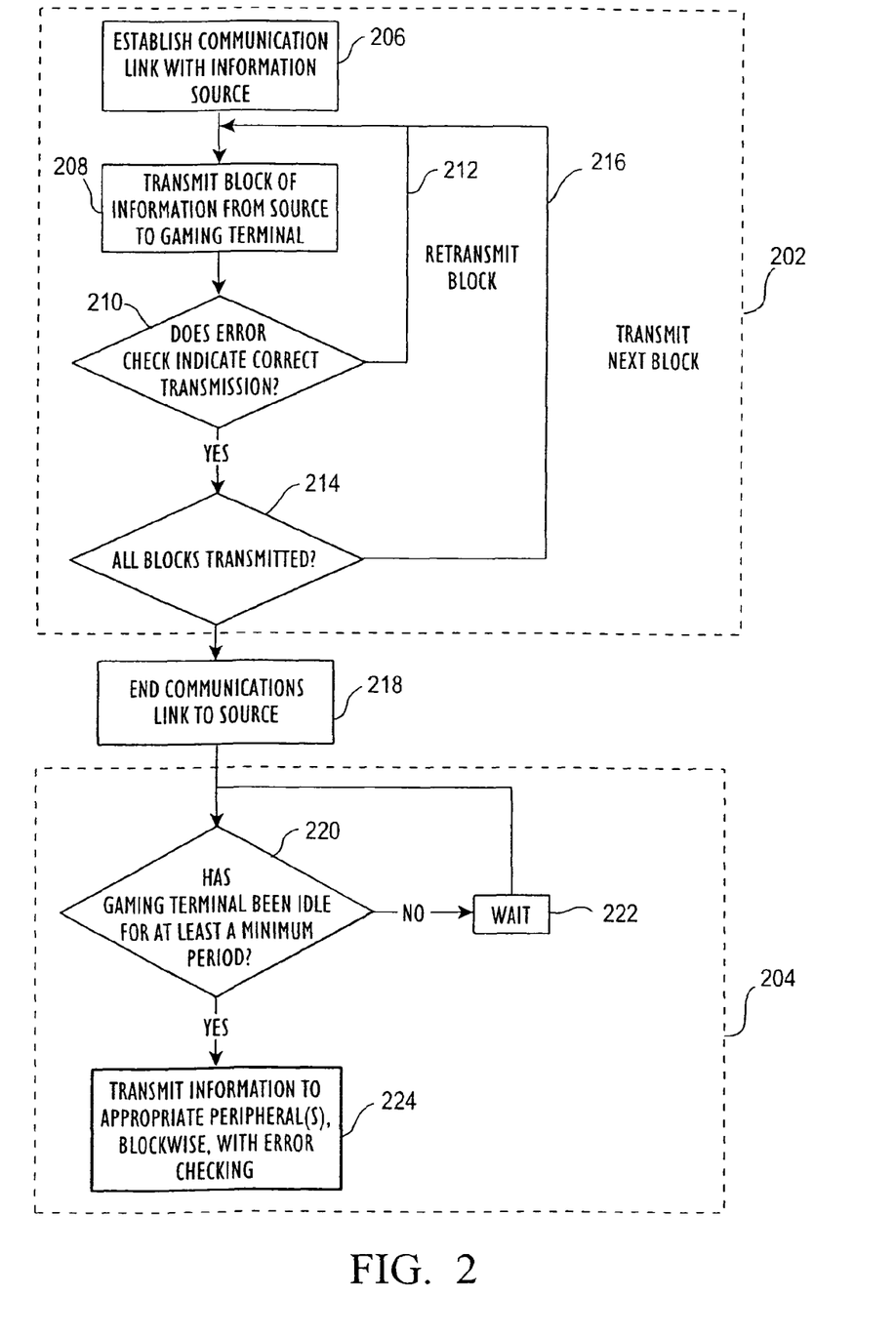
FIG. 2 is a flow chart of a procedure for downloading information according to an embodiment of the present invention.

In the embodiment of FIG. 2, the data is transmitted in a block fashion, i.e., by transmitting a predetermined number of bits of the information (such as 1024 bits) from the source to the gaming terminal 208, and then checking for errors in the block 210. As will be well-known to those of skill in the art, other block lengths can also be used. Preferably, the data is transmitted by a serial transmission protocol. In one embodiment, verification or other checking is performed to assist in detecting data transmission or other errors. A number of well-known verification or error detection schemes can be used, such as a CRC. One type of CRC check is described in U.S. patent application Ser. No: 08/348,258, filed Nov. 30, 1994, U.S. Pat. No. 5,644,704 for "METHOD AND APPARATUS FOR VERIFYING THE CONTENTS OF A STORAGE DEVICE" (incorporated herein by reference). These or other verification or error checking schemes can be adapted for use in the present invention in a manner that will be apparent to those of skill in the art, after understanding the present disclosure.

If there are errors detected in the block of information (using, e.g. a cyclic redundancy check error detection routine, or other error detection routines well-known to those of skill in the art), the procedure loops back 212 to retransmit the block. Preferably, after some blocks have been successfully downloaded, errors in subsequent blocks do not necessarily require reinitiating the download from the beginning but, only requires downloading, anew, those blocks which have not thus far been successfully transmitted. In one embodiment, only a limited number (e.g., 3) of the re-tries are permitted before a "total error" is declared and, e.g., the device is put out of service. At the end of each block transmission, it is determined 528 whether all blocks have been transmitted 214. If not, the procedure loops back 216 to transmit the next block. Preferably, following the CRC or other error detection for each block, an overall CRC or other error check (e.g. digital signature) is performed after all blocks have been downloaded to the gaming terminal. Thus, at the end of the first portion of the procedure 202, the entire desired information will have been transmitted, block-wise, with error detection, from the information source 108 to at least one gaming terminal 102.

After all blocks have been successfully downloaded, a verification stage is initiated by sending a message to the target device (or devices) which requests certain verification information 532. In one embodiment, the verification information is based on (such as being calculated from) information stored in the target device, and preferably including at least some of the downloaded information. For example, a CRC or other digital signature based on some or all of the downloaded information can be used. Preferably, the portion of the information which is used as the basis for calculating verification information or signature is selected in a fashion that is not readily known or predictable in advance or by unauthorized persons. For example, rather than always calculating the verification signature based on information starting from a predetermined and/or unchanging starting address, it is preferred that the verification signature be calculated from a starting address which is different for different download operations and/or different terminals. In one embodiment, the starting address is randomly selected and communicated (e.g. as part of the verification request message 532). For further promoting confidence in the verification system, it is possible to use a digital signature calculation procedure which is based on a private key value which is preferably randomly selected by the source computer and used to encrypt part of the download information. In response, the gaming terminal uses a known procedure (such as a decryption calculation procedure) to calculate the verification signature. If the calculated verification signature matches the expected verification signature, verification is considered to have been accomplished.

Upon receiving a valid verification 534, the download session can be completed. If a valid verification is not obtained, a failure is declared 538 and an error-handling procedure can be initiated e.g. to provide notification to operators and/or reinitialize the download procedure.

As will be apparent to those of skill in the art after understanding the present disclosure, the particular procedures illustrated in FIG. 5 may be modified or varied in a number of ways. For example, although it is believed a high and desirable level of security is achieved when all four phases (identification, negotiation, downloading and verification) are used, it is possible to provide for downloading procedures in which one or more of the phases is eliminated or abbreviated. For example, it would be possible to provide for a somewhat secure download procedure without including a verification step. Additionally, the download method according to the present invention is not necessarily strictly limited to the order of steps illustrated in FIG. 5. For example, it may be possible to perform some or all negotiation steps prior to some or all identification steps. Some or all of the steps or phases described in connection with FIG. 5 can be used in connection with purposes other than downloading, such as using identification and/or verification transactions to query and check loaded programs e.g. by regulatory agencies.

In light of the above description a number of advantages of the present invention can be seen. The present invention makes it feasible to reduce or eliminate the need for manual operations (such as physically visiting, and opening gaming terminals, analyzing, testing and/or replacing boards or components) in connection with program updating, replacement, modification and the like, while maintaining a high level of security and reliability. The present invention provides the ability to query a gaming terminal to obtain hardware and software information for regulatory, maintenance, repair, inventory, and similar purposes. The present invention makes it feasible to download information to one or many machines at the same time. The downloaded information may be information particularly directed to peripheral devices (such as a updating a bill acceptor program) and/or may involve changing features of a game such as upgrading or adding a bonus game or similar feature to a gaming terminal. The present invention is useful in facilitating the standardization of programming or other data across a variety of gaming terminals. The present invention provides the ability to permit local customers such as individual casinos or similar locations, to download their own customized video and/or audio files (e.g., using the security features described to provide regulators with assurance that downloading of such files will not change or result in unacceptable modifications to other features of game operation). The present invention facilitates the ability of casinos, game operators, game manufacturers and the like to obtain and maintain accurate inventories on programs and board modules in gaming machines. The present invention facilitates locating or identifying particular printed circuit boards (or particular classes or types of PCBs or other components on a casino floor). The present invention facilitates the secure and reliable automatic electronic loading of programs into machines in a manufacturing (assembly line) environment e.g. based on customer orders, with reduction or elimination of manual steps in such process. The present invention facilitates querying and verifying the presence and nature of hardware or software components thereof e.g. at the end of an assembly or fabrication process such as before shipping to customers, upon receipt, and the like. The present invention facilitates a verification of installed programs e.g. by gaming and/or lottery regulatory agencies.

Providing downloading from a central computer to individual gaming terminals has a number of advantages. The download can be easily performed on a number of gaming terminals at the same time, so that the amount of time required to perform the download for all the various gaming terminals is reduced. Further, it is not necessary to have personnel physically walk from terminal to terminal, and perform a download at each terminal, so that labor costs are also reduced.

The present invention makes it possible to provide for new or additional programming for peripheral devices in a manner which is secure, less labor intensive, less time-consumptive, and less obtrusive than previous methods. The present invention makes it possible to download the programming to a plurality of gaming terminals (or other computing devices) substantially simultaneously.

A number of variations and modifications of the invention can also be used. In addition to downloading computer program information, the invention can be used to download data such as data which defines the manner in which peripherals accept currency (or, detect counterfeiting). In addition to a central computer and a portable computer hand-held device, the information may be downloaded to the gaming terminal from other devices, such as a cluster controller. When reprogramming of two or more peripherals attached to a given gaming terminal is desired, in one embodiment, the new programming information for each peripheral to be reprogrammed is downloaded to the gaming terminal and the gaming terminal begins downloading the information to the attached peripherals preferably only after all information has been downloaded to the terminal. In this way, only a single session of downloading to the gaming terminal is needed in order to provide eventual updating of two or more coupled peripherals.

In situations in which security is a concern, such as systems in which money handling occurs (e.g. gaming terminals, lottery terminals, and the like) the information may be encrypted when it is transferred to the computing device and is decrypted either in the gaming device or in one or more peripheral devices.

Preferably the transactions are controlled and monitored automatically e.g. using an information file generated from information from firmware, mechanical, configuration, jurisdiction approvals and production bill of materials. Preferably such an information file is always encrypted, although program or other download data can be compressed and/or encrypted e.g. depending upon jurisdiction requirements. In one embodiment, the information file contains a number of fields including the filename, source directory or path, destination directory, version number or other version designator, CRC value, platform code (e.g. indicating the type of gaming terminal), target code (e.g. indicating the type of peripheral (e.g. bill validator)), agency approval(s), and game name or other game indicator.

Although the procedures and steps illustrated and described in connection with FIG. 5 are believed to provide a high level of security, it is believed that security of the entire system is particularly enhanced by the combination of the identification, especially hardware and/or memory-based identification (residing on the gaming terminal or gaming terminal components) and the procedures and steps illustrated in FIG. 5, particularly when combined with an information file as described.

In the embodiment of FIG. 1B it is possible to download the information to two or more gaming terminals 102a, 102b, substantially simultaneously. However, in some configurations, it will be necessary to suspend use of the gaming terminal during the downloading process. In this case, it may not be desirable to suspend operation of all gaming terminals at the same time. Therefore, in one embodiment information is downloaded from the central computer 108 to a first subset of the connected gaming terminals (during which time, use of that subset of gaming terminals is suspended), and following downloading to that subset of gaming terminals the first set of gaming terminals will be available for normal use, and downloading to the second subset of gaming terminals will be initiated, suspending use of the second subset of gaming terminals during downloading thereof. The process is repeated for various subsets of the gaming terminals until the information has been downloaded to all desired gaming terminals. In some situations, it may be desired to download information only to some of the connected gaming terminals. For example, if the information to be downloaded is intended to thwart passing of $10 counterfeit bills, there would be no need to download the new information to gaming terminals which are connected to currency acceptor peripherals that accept only $5 bills.

In the embodiment depicted in FIG. 1B, each gaming terminal 102a, 102b is coupled to a central computer 1108. The coupling may be by communication link 1124, such as a common local area network connection (e.g., Ethernet, Token Ring, LocalTalk, etc.), a wide area network and the like, using any of a variety of physical media such as cables, optical fibers, radio, infrared or other wireless links and the like. The type of communication module 1114a, 1122, which will be used depends on the type of communication link which is being used and may include, e.g., commercially-available network boards and supporting software, modems, universal asynchronous receiver/transmitter (DART) devices and the like.

As noted above, in some configurations it may be necessary to suspend operation of the gaming terminal during downloading from the information source to the gaming terminals, and/or from the gaming terminal to the peripheral. In one embodiment, the gaming terminal will provide an indication of the suspended status, so that a user will have the option to move to a different gaming terminal or to await reactivation. In one embodiment, the display 103 will provide an estimate of the amount of time before reactivation of the terminal. This estimate can be based, if desired, on an empirically-derived relationship between the average download time and the number of blocks of information to be downloaded, (or other indication of the size of the information to be downloaded).

In situations in which operation or use of the gaming terminal must be suspended while the information is being downloaded to peripherals, it may be desirable to configure the gaming terminal to wait until there is an apparent idle period on the gaming terminal before commencing downloading to a peripheral. Thus, in the procedure of FIG. 2, the gaming terminal will determine whether it has been idle for at least a predetermined minimum period (such as about one minute, 220). For example, when the gaming terminal is an electronic slot machine, the gaming terminal can use at timer circuit to determine if there has been any wager placed or any handle-pull or electronic equivalent thereof) for the predetermined period. If the gaming terminal has not been idle for at least the predetermined period, the gaming terminal will optionally wait another predetermined period 221 (such as about one minute) before testing to determine if the gaming terminal is idle. Once the gaming terminal is idle, the gaming terminal can commence procedures to transmit information to appropriate peripherals 224, preferably in a blockwise fashion, with error checking.

The present invention, in various embodiments, includes components, methods, processes, systems and/or apparatus substantially as depicted and described herein, including various embodiments, subcombinations, and subsets thereof. The present invention, in various embodiments, includes providing devices and processes in the absence of items not depicted and/or described herein or in various embodiments hereof, including in the absence of such items as may have been used in previous devices or processes, e.g. for achieving ease and reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended the appended claims be construed to include alternative embodiments to the extent permitted.

The invention is claimed as follows:

1. A method for downloading software from a source to a first gaming device in a network of gaming devices, the method comprising:
    (a) accessing first information in a first memory location of a one-time programmable or add-only memory of said first gaming device, said first information identifying at least a first hardware component of said first gaming device;
    (b) transmitting said first information to said source;
    (c) identifying said at least first hardware component with reference to said first information received from said first gaming device;
    (d) verifying that said software is compatible with said at least first hardware component of said first gaming device and that said software is approved for use with said at least first hardware component of said first gaming device based on the gaming jurisdiction in which said first gaming device is located, wherein said first gaming device and a second gaming device in said network of gaming devices are configured differently;
    (e) transmitting second information from said source to said first gaming device describing at least a first characteristic of said software and a request for an approval response verifying that said first gaming device is in a ready mode including determining if said first gaming device has current credits granted;
    (f) transmitting said approval response from said first gaming device to said source indicating that said first gaming device is configured to receive said download;
    (g) determining if said first gaming device has been idle for at least a designated amount of time;
    (h) transmitting said software to a programmable memory in said first gaming device and third information identifying said software from said source to said first gaming device when said first gaming device has been idle for at least said designated amount of time; and
    (i) storing said third information identifying said software in a second memory location of said one-time programmable or add-only memory of said first gaming device in association with said software and wherein said third information stored in said second memory location cannot be changed or erased.

2. The method of claim 1, which includes: calculating a signature based at least partially on a random starting address and transmitting said signature to said source; and comparing said signature with a signature available to said source.

3. The method of claim 1, which includes repeating (g) when said first gaming device has not been idle for said designated amount of time.

4. The method of claim 1, which includes repeating (g) after a predetermined time period when said first gaming device has not been idle for said designated amount of time.

5. The method of claim 1, wherein the designated amount of time is based on the time between wagers made by a player.

6. The method of claim 1, wherein the designated amount of time is based on the time between handle pulls by a player.

7. The method of claim 1, which includes transmitting the software in a blockwise sequence.

8. The method of claim 1, wherein said first information includes information identifying software stored on said first gaming device and further includes at least one of serial or other hardware identification numbers, manufacturing ID information or codes, manufacturer name, hardware or software revision designations, date of manufacture, date of installation, date of sale, date of shipping, date of software revision and software file size.

9. The method of claim 1, wherein said second information includes information identifying software stored on said source and further includes at least one of a board serial number, a board version number, a clock speed, a processor type, a software indicator, a software version number, a date of assembly, and an indicator of gaming regulatory jurisdiction.

10. The method of claim 1, wherein said third information includes at least one of a software indicator, a software revision designation, date of software revision, software file size, and an indicator of gaming regulatory jurisdiction.

11. The method of claim 1, wherein said first gaming device includes a plurality of circuit boards, and wherein said source is coupled to a first of said circuit boards and wherein said first information identifies hardware on at least a second of said circuit boards.

12. The method of claim 1 wherein said first gaming device includes a plurality of circuit boards which contain a non-programmable memory storing hardware identification information.

13. The method of claim 1, wherein transmitting said software from said source to said first gaming device uses a serial data transmission protocol.

14. The method of claim 1, further comprising:
transmitting fourth information from said second gaming device to said source, said fourth information identifying at least a second hardware component of said second gaming device;
comparing said fourth information to predetermined fourth information to determine whether said software is appropriate for said at least second hardware component of said second gaming device; and
determining that the software is not appropriate for said at least second hardware component of said second gaming device.

15. The method of claim 14, wherein the steps after the verifying step are not performed with respect to the second gaming device.

16. An apparatus for downloading software from a source to a gaming device, the apparatus comprising:
a processor and programming to carry out the steps of:
accessing first information in a first memory location of a one-time programmable or add-only memory of said gaming device, said first information identifying at least a first hardware component of said gaming device and wherein said first information stored in said first memory location cannot be changed or erased;
transmitting said first information to said source;
identifying said at least first hardware component with reference to said first information received from said gaming device;
verifying, based on said first information, that said software is appropriate for said at least first hardware component based on the gaming jurisdiction in which the gaming device is located;
transmitting second information from said source to said gaming device describing at least a first characteristic of said software and a request for an approval response;
verifying that said gaming device is in a ready mode by determining if said gaming device has current credits granted;
transmitting the approval response from said gaming device to said source indicating that said gaming device is configured to receive said download;
determining if said gaming device has been idle for at least a designated amount of time;
transmitting said software to a programmable memory in said gaming device and third information identifying said software from said source to said gaming device via downloading means when said gaming device has been idle for at least said designated amount of time; and
storing said third information identifying said software in a second memory location of said one-time programmable or add-only memory of said gaming device in association with said software and wherein said third information stored in said second memory location cannot be changed or erased.

17. The apparatus of claim 16, further including a calculator configured to calculate a signature based at least partially on a random starting address;
and a comparator configured to compare said signature with a signature available to said source.

18. The apparatus of claim 17, wherein said calculation is configured to calculate a digital signature based on data stored in memory using a public key encryption/decryption algorithm.

19. The apparatus of claim 16, wherein said first information includes at least one of serial or other hardware identification numbers, manufacturing ID information or codes, manufacturer name, hardware or software revision designations, date of manufacture, date of installation, date of sale, date of shipping, date of software revision and software file size.

20. The apparatus of claim 16, wherein said third information includes at least one of a software indicator, a software revision designation, date of software revision, software file size, and an indicator of gaming regulatory jurisdiction.

21. The apparatus of claim 16, wherein said gaming device includes a plurality of circuit boards, and wherein said source is coupled to a first of said circuit boards and wherein said first information identifies hardware on at least a second of said circuit boards.

22. A network of gaming devices, comprising:
a first gaming device having at least a first hardware component and a first one-time programmable or add-only memory;
a second gaming device having at least a first hardware component and a second one-time programmable or add-only memory, wherein the first and second gaming devices are configured differently and wherein information stored in a memory location of said first and second one-time programmable or add-only memories cannot be changed or erased;
a source device in communication with the first and second gaming devices and including:
software to be downloaded to at least one of the first and second gaming devices;
a verifier for determining whether the software is appropriate for the at least one of the first and second gaming devices,
the verifier accessing predetermined first information concerning a desired characteristic of at least one of the first and second gaming devices in a first memory location of at least one of the first and second one-time programmable add-only memories, and
the verifier comparing first information, concerning a characteristic of at least one of the first and second gaming devices, to the predetermined first information to determine if the software is approved for use with at least one of the first and second gaming devices based on the gaming jurisdiction in which the at least one of the first and second gaming devices is located;
a negotiator configured to determine that at least one of the first or second gaming devices is in a ready mode including determining if the first gaming device has current credits granted;
a data transferor configured to transfer the software to a programmable memory of at least one of the first and second gaming devices after at least one of the first and second gaming devices has been idle for at least a designated amount of time; and
a comparator configured to compare a signature received from a second memory location of at least one of the first and second one-time programmable or add-only memories, wherein the signature is stored in the second memory location such that it cannot be changed or erased, with a signature based at least partially on a random starting address and available to the source device.

23. The network of claim 22, wherein the designated amount of time is based on the time between wagers made by a player.

24. The network of claim 22, wherein the designated amount of time is based on the time between handle pulls by a player.

25. The network of claim 22, further comprising: a local controller in communication with the first and second gaming devices and the source device.

26. The network of claim 25, wherein the local controller includes a local server and a cluster controller.

27. The network of claim 22, wherein the at least one of the first and second gaming devices further includes:
(i) a signature calculator configured to calculate a signature based at least partially on the date; a random starting address; and
(ii) a signature transmitter configured to transmit the signature to the source device.

* * * * *